United States Patent
Woods et al.

(10) Patent No.: US 6,360,279 B1
(45) Date of Patent: Mar. 19, 2002

(54) TRUE PARALLEL CLIENT SERVER SYSTEM AND METHOD

(75) Inventors: Jeffrey Herbert Woods; Jayson Ben Crisman, both of Dallas, TX (US)

(73) Assignee: Bea Systems, Inc., Dallas, TX (US)

( * ) Notice: Subject to any disclaimer, the term of this patent is extended or adjusted under 35 U.S.C. 154(b) by 0 days.

(21) Appl. No.: 08/950,493

(22) Filed: Oct. 14, 1997

(51) Int. Cl.$^7$ .................................................. G06F 9/46
(52) U.S. Cl. ...................................................... 709/318
(58) Field of Search ................................ 709/300, 301, 709/304, 102, 105, 104, 203, 318, 310

(56) References Cited

U.S. PATENT DOCUMENTS

| | | | | |
|---|---|---|---|---|
| 4,885,789 A | * | 12/1989 | Burger et al. ................ | 713/164 |
| 5,249,290 A | * | 9/1993 | Heizer ......................... | 395/650 |
| 5,257,372 A | * | 10/1993 | Furtney et al. .............. | 395/650 |
| 5,267,235 A | * | 11/1993 | Thacker ........................ | 370/60 |
| 5,313,647 A | * | 5/1994 | Kaufman et al. ............ | 709/102 |
| 5,835,765 A | * | 11/1998 | Matsumoto .................. | 709/102 |
| 5,884,022 A | * | 3/1999 | Callsen et al. ................ | 714/22 |

OTHER PUBLICATIONS

W. Richard Stevens, Unix Network Programming, 1990, Prentice–Hall, p. 75–86, 189–191, 206–213, 258–260, 270–275, and 326–339.*

IBM TDB, "Parallel Processing of Requests and Data Transfer in Computer Input/Output", vol. 38, No. 4, pp. 329–332, Apr. 1995.*

* cited by examiner

*Primary Examiner*—Alvin Oberley
*Assistant Examiner*—Sue Lao
(74) *Attorney, Agent, or Firm*—Baker Botts L.L.P.

(57) ABSTRACT

A software system to provide a true-parallel, client-server system comprises a server 52. The server 52 comprises any suitable system for using and supporting an operating system 54. The operating system 54 is operable to create and delete processes, as well as manage server resources. The operating system 54 is further operable to provide a well-known address 56 with an associated buffer 58. The operating system 54 is further operable to support the notification system 60 to notify a plurality of processes, in parallel, that information has arrived at the well-known address 56 and that the information has been stored in the buffer 58. The plurality of handler processes 62 are operable to accept and remove, in parallel, pending requests from the buffer 58. The spawner process 64 is operable to initialize the well-known address 56 and spawn handler processes 62. The server 52 communicates with the clients 50 via the network 66. The clients comprises suitable systems for generating and transmitting requests over a network 66. The network 66 is any suitable system for communicating data between the plurality of clients 50 and the server 52.

2 Claims, 3 Drawing Sheets

TRUE PARALLEL CLIENT SERVER SYSTEM AND METHOD

TECHNICAL FIELD OF THE INVENTION

This invention relates in general to the field of computer and software systems and more particularly to an improved true parallel client-server system and method of operation.

BACKGROUND OF THE INVENTION

Historically, computer systems have evolved from a single program running on a single computer to distributed client-server systems. As computer technology advanced, programs increased in size and complexity. More powerful computers were built in order to handle the increasingly complex programs, but the limitations associated with having all program functionality concentrated on a single computer soon became apparent. Client-server systems were developed in order to overcome these limitations. Client-server systems were designed around the idea of a division of labor. Client-server systems remove the limitations associated with running complex programs on a single system, and allow complex programs to be divided into many simpler processes and spread across a plurality of computer systems. This division of labor allows for the simultaneous processing of multiple tasks in parallel and represents a dramatic performance increase relative to serial processing architectures.

Client-server systems offer numerous advantages over the single-program single-computer paradigm that proceeded the development of the client-server paradigm. One of the problems associated with switching over to client-server systems was that the single-program single-computer paradigm was still firmly rooted in the minds of many programmers. Programs could be switched over to client-server systems more quickly than the minds of their programmers could be switched over to client-server methods of thinking. Programmers continued to optimize only the sub-components of a client-server system. For example, the components that ran on the client or on the server were optimized while neglecting the communications activity that must take place between the client and the server in the client-server system. The single-program single-computer paradigm also impacted the methods used to ensure server availability and server processing of client requests.

The pioneers in the development of client-server systems, developed client-server communication systems that were biased toward the processing of competing client requests for a single published service in a serial manner. This serial processing method of design, developed from the single-program single-computer paradigm, led to the creation of bottlenecks in the client-server communication process. The bottleneck in the client-server communication process typically appeared between the arrival of the client request at a server and the dispatching of the received request for service.

Accordingly, a need has arisen for a software system that addresses the problem of the sequential characteristics of acknowledging and dispatching received client requests to handler processes without creating bottlenecks on the server.

SUMMARY OF THE INVENTION

In accordance with the teachings of the present invention, a true parallel client-server system and method of operation is provided that substantially eliminates or reduces the problems and disadvantages associated with prior systems and methods.

According to one embodiment of the present invention, a client-server system is provided that comprises an operating system operable to receive requests for service and store received requests. The operating system is further operable to provide interprocess communication and to notify, in parallel, a plurality of handler processes that requests are pending. A server system uses the operating system. The client-server system utilizes a communication system that facilitates communication between the server system and the plurality of client systems. The software system further comprises a spawner process which is operable to create the handler processes. The plurality of handler processes are operable to receive, in parallel, notifications from the operating system of pending requests. The plurality of handler processes are also operable to attempt acceptance, in parallel, of pending requests. Finally, the plurality of handler processes are also operable to service requests.

According to one specific embodiment each handler process also comprises a plurality of threads. Threaded handler processes allow an increase in the number of requests that can be handled, while requiring only a minimal increase in the amount of server resources used.

According to another specific embodiment, the spawner process is further operable to increase or decrease the number of handler process currently existing on the server. The magnitude of the increase or decrease in the number of handler processes may be based on server activity. The process of increasing or decreasing the number of handler processes currently existing on the server is known as "load balancing." By implementing load balancing, client requests can be efficiently serviced without wasting system resources.

According to another specific embodiment, the server also comprises a plurality of physical processors. A multiple physical processor server increases the number of requests that can be handled.

An important technical advantage of the present invention inheres in the fact that the system is able to notify handler processes of pending requests and allow those pending requests to be accepted in parallel by the handler processes to eliminate the bottleneck problem found in prior server systems.

BRIEF DESCRIPTION OF THE DRAWINGS

A more complete understanding of the present invention and the advantages thereof may be acquired by referring to the accompanying FIGURES in which like reference numbers indicate like features and wherein.

DETAILED DESCRIPTION OF THE INVENTION

Figure 1:
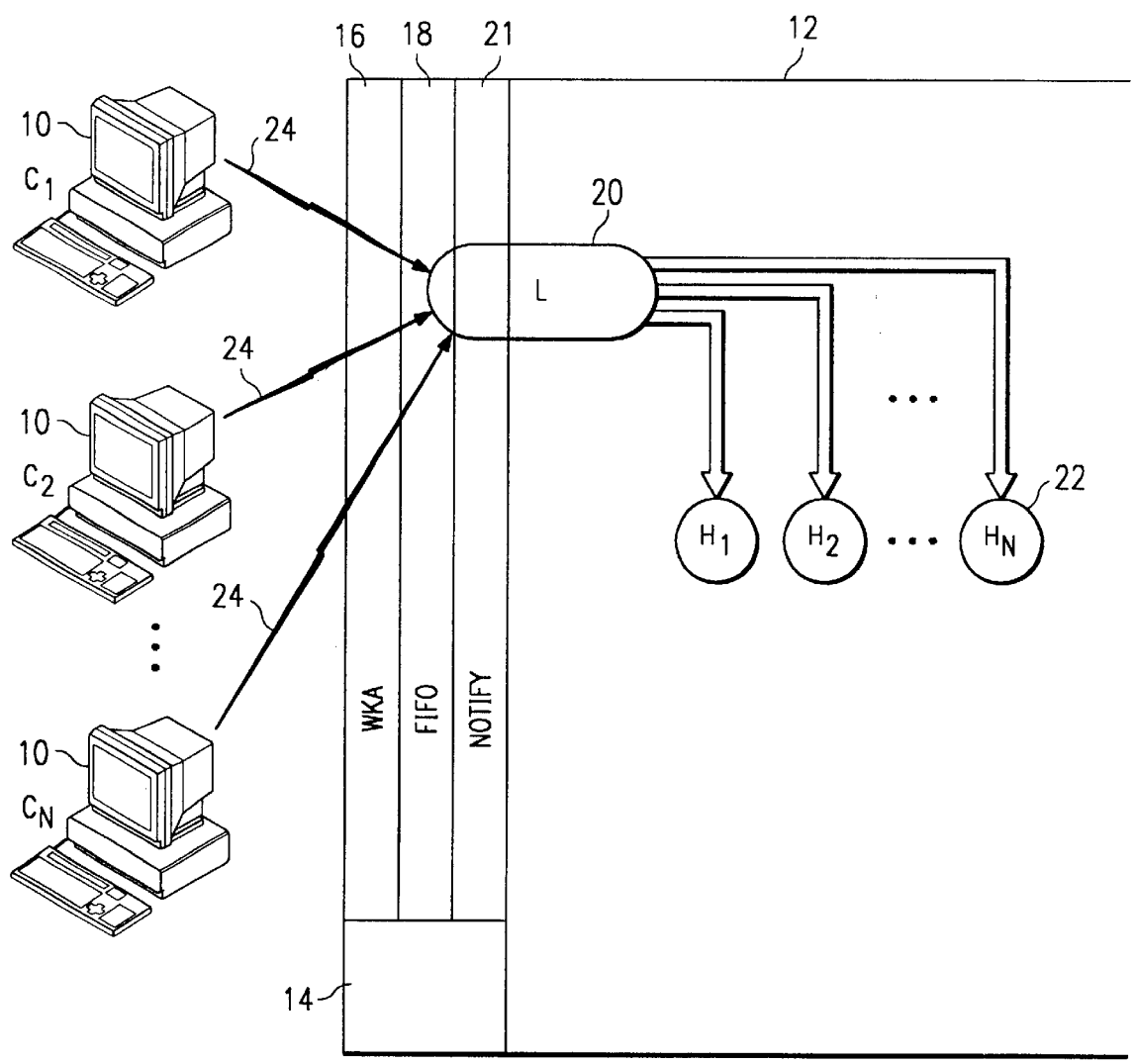
FIG. 1 is a block diagram illustrating the concurrent method of servicing requests.

FIG. 1 is a block diagram illustrating the concurrent model of server design. The concurrent model is a typical system for accepting and servicing client requests. The concurrent system comprises a concurrent server 12. The concurrent server 12 is a computer system suitable to use and support a concurrent operating system 14. The concurrent operating system 14 is operable to manage system resources on the concurrent server 12. The concurrent operating system 14 is further operable to support and manage a concurrent well-known address 16. The concurrent well-known address 16 is operable to receive data from a network 24. Typically, the concurrent well-known address 16 will be dedicated to providing a particular service and be further operable to receive, over the network 24, requests for service from a plurality of client systems 10.

Associated with the concurrent well-known address 16 is a first-in-first-out (FIFO) buffer 18. The FIFO buffer 18 is managed by the operating system 14 and is operable to store pending requests from the client systems 10 that have been received by the concurrent well-known address 16. Pending client requests remain in the FIFO buffer 18 until the pending requests are removed from the buffer by a process. The FIFO buffer 18 further operates to store pending requests in the order in which the pending requests arrived, hence the designation "first-in-first-out."

The concurrent system further comprises a listener process 20. The listener process 20 is operable to remove pending requests from the FIFO buffer 18. The listener process 20 is notified of the existence of pending requests in the FIFO 18 by a notification system 21. The notification system 21 signals listener process 20 upon receipt of a client request in FIFO 18. The listener process 20 is further operable to spawn concurrent handler processes 22. Typically, after the listener process 20 removes a pending request from the FIFO buffer, the listener process 20 will spawn one concurrent handler process 22 to provide service to the pending request just removed from the FIFO buffer 18. The listener process 20 will then dispatch the pending request to the recently created concurrent handler process 22 for service. The listener process 20 continues to remove pending requests from the FIFO buffer 18 and dispatch the pending requests to spawned concurrent handler processes 22 until all pending requests have been removed from the FIFO buffer 18.

The network 24 is a system suitable to provide for the transfer of data between client systems 10 and server system 12. Client systems 10 are computers suitable to generate and transmit service requests via the network 24.

The concurrent system suffers from certain defects. One defect in the concurrent system is that bottlenecks are created by the listener process 20. The listener process 20 is a single process which is responsible for removing each and every client request from the FIFO buffer 18, creating a concurrent handler process 22, and dispatching the request to the concurrent handler process 22. Some amount of processor overhead is associated with creating a process and dispatching a request, and during the overhead time the listener process 20 is unable to remove pending requests from the FIFO buffer 18. When a large number of client systems 10 are sending requests to the server 12, the overhead time can cause a significant build-up of pending requests in the FIFO buffer 18. The FIFO buffer 18 can store only a limited number of pending requests at one time. Once the FIFO buffer 18 fills up, all newly arriving requests are rejected by the concurrent well-known address 16. Rejecting requests increases the load on the network 24 because client systems 10 must resend requests. Additionally, the efficiency of server 12 is decreased because server capacity to handle requests goes unused while the listener process 20 deals with built-up pending requests.

Figure 2:
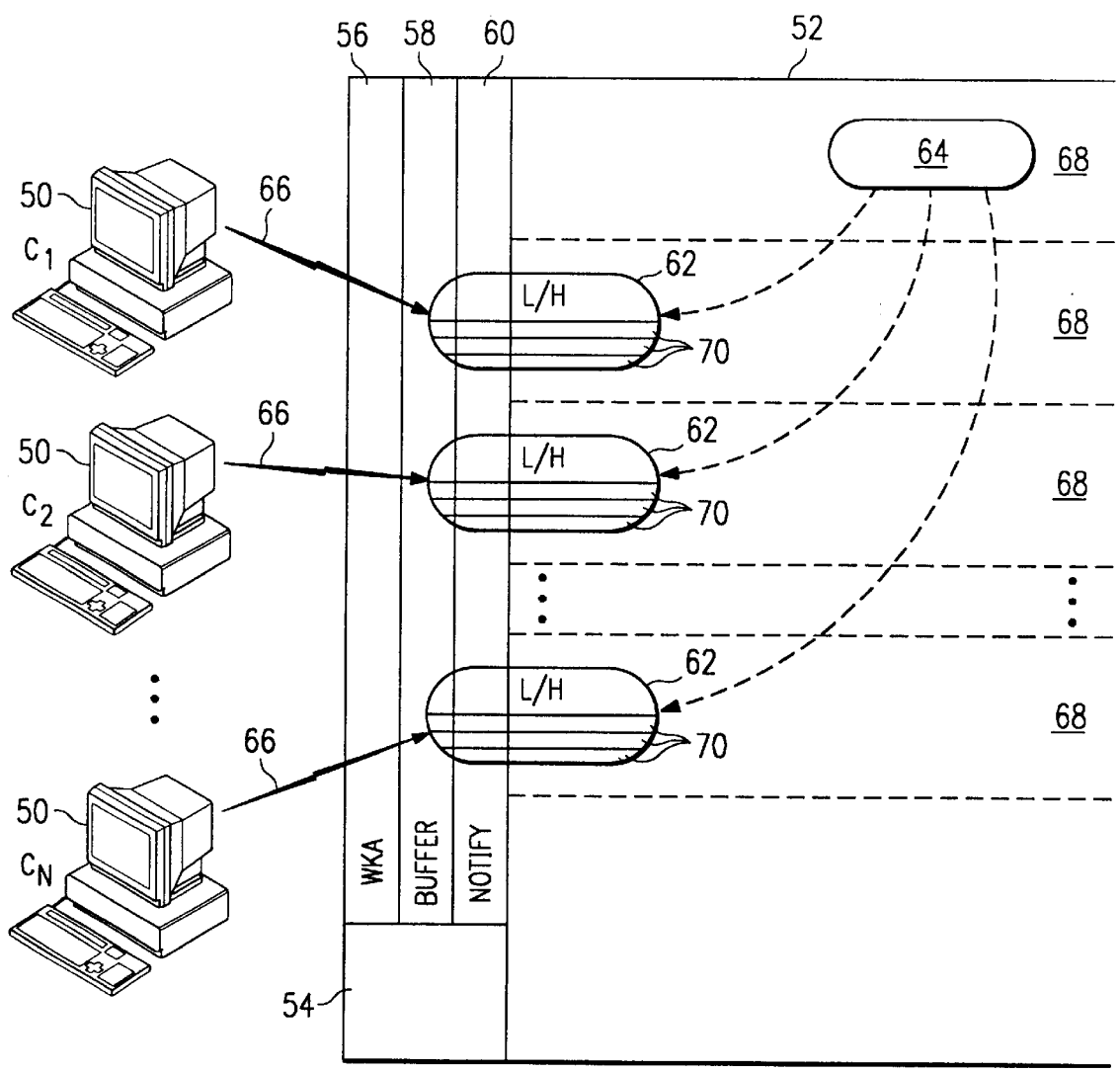
FIG. 2 is a block diagram illustrating the connection method of the present invention.

FIG. 2 is a block diagram illustrating one embodiment of a client-server system constructed according to the teachings of the present invention. The embodiment shown in FIG. 2 comprises a server 52. The server 52 may comprise any suitable computer or other device with storage and processing capability or may alternatively comprise any suitable logical entity in hardware and/or software. For example, the server 52 could comprise a massively parallel computer, a mainframe computer, a mini-computer or a personal computer.

The server 52 uses and supports an operating system 54. The operating system 54 is operable to manage server system resources. Server system resources may comprise memory, network communication points, processes, and storage systems. The operating system 54 is typically responsible for managing the communication and operational needs of all hardware and software systems associated with the server system 52.

One type of software system that is managed by the operating system 54 is a process. The process is an executing or executable program. The process may also be in any one of several states. One common state for the process to be in is the run state. In the run state, a process is executing the instructions in a program. Another common state for a process to be in is the sleep state. In the sleep state, the process still has resources assigned to the process, but is not currently executing any of the instructions in the program. A sleeping process may be awakened and will resume processing from the exact point where the process stopped processing when the process went to sleep.

The operating system 54 further manages a well-known address 56. The well-known address 56 is a suitable logical or physical entity in hardware or in software which is operable to receive data. The well-known address 56 is a particular logical or physical location, typically on the server 52, which has been dedicated to providing a service to clients 50. The service that the well-known address 56 provides is typically made known to the public so that clients 50 desiring the service provided by the well-known address 56 know where the desired service maybe obtained.

The concept of a well-known address is typically found when dealing with networked computer systems. For example, in TCP/IP a well-known address is called a port. A list of ports and the service associated with a port is publicly available from the server. Clients 50 may then connect to a port in order to receive service.

An example of a TCP/IP based service that utilizes ports is e-mail. The process of sending a piece of e-mail is initiated when the user activates an e-mail client program. The user then uses the client program to type in the actual message that the user wishes to send. The client program then formats the user's e-mail message according to the appropriate TCP/IP e-mail protocol. Once the message has been formatted, the client program will contact a particular port, in the case of TCP/IP, e-mail service is supplied by port 29, on a server. A program on the server is listening to port 29 for client connections. Once the e-mail client contacts the server, the program listening to the port on the server accepts the client's e-mail message and sends the message to the appropriate destination.

Associated with the well-known address 56 is a buffer 58. The buffer 58 is operable to store information received at the well-known address 56. Typically, the buffer 58 has access to a limited amount of memory space. Since the buffer may access only a limited amount of memory, the buffer may fill up if a large amount of information arrives at the well-known address 56 and the information is not removed from the buffer 58 by some other program. The buffer 58 is also operable to have data removed from the buffer 58 by a program or process. The buffer 58 may comprise any suitable organization of memory or other suitable storage resources. For example, a buffer could be organized as a queue, a stack, or some other type of ordered or non-ordered list. The methods for accessing the buffer 58, as well as the organization of the memory that makes up the buffer 58, is typically managed by the operating system 54.

One of the reasons well-known addresses 56 and their associated buffers 58 exist is to provide service to clients 50. Each of the clients 50 may comprise any suitable computer or other device with storage and processing capabilities or may alternatively comprise a terminal or other input/output device without significant local storage or processing capabilities. Each of the clients 50 may comprise, in general, any suitable logical or physical entity in hardware or software separate or integral to the server 52. For example, the client 50 could be equivalent to the server in processing capabilities, but could also be a home computer. Clients 50 are operable to generate and send out requests for service via a network 66.

The network 66 may comprise any logical or physical communication system suitable to communicate data between clients 50 and servers 52. An example of a logical network system is a TCP/IP network. TCP/IP does not denote anything about the underlying network hardware, but specifies a protocol for communicating data over that hardware. An example of network hardware would be the interface cards and coaxial cables that may comprise a network.

Once the clients 50 have sent requests for service via the network 66 to the well-known address 56 on the server 52, those requests are placed in the buffer 58, and the operating system 54 then activates a notification system 60 associated with the buffer 58. The notification system 60 may comprise any suitable logical or physical entity operable to notify a plurality of processes on the server that information is in the buffer 58. The notification system 60 is typically managed by the operating system 54. An example of the notification system 60 is a flag. A flag is a particular location in memory operable to reflect a change in state of some other entity. Typically, a flag will toggle between two different values. In the example of a flag used as part of the notification system 60 for the buffer 58 associated with the well-known address 56, the flag will have one value denoting an empty buffer and another value denoting a non-empty buffer. Flags need not denote quantity of information, so a flag in the notification system need not convey how much information is in the buffer, only that information exists in the buffer.

At system initialization, a spawner process 64 comes into existence on the server 52. The spawner process 64 is responsible for working with the operating system 54 to initialize the well-known address 56 and spawn a plurality of handler processes 62. The typical spawner process 64 is operable to control the actual number of handler processes 62 that are created. The spawner process 64 may use any suitable algorithm or heuristic to determine the actual number of handler processes to initially spawn. For example, a heuristic might take into account server processing capability and the expected number of requests per unit of time and then spawn an appropriate number of handler processes.

The handler processes 62 are the processes actually responsible for providing the service that is advertised to be available at the well-known address 56. All the handler processes 62 created by the spawner process 64 are operable to monitor the notification system 60 in parallel. Here, "in parallel" means that the current state of the notification system 60 is available to any handler process 62 at any moment in time. Thus, any change in the state of the notification system 60 is immediately reported to the plurality of handler processes 62.

The plurality of handler processes 62 are also operable to attempt parallel acceptance of requests from the buffer 58. Parallel acceptance of pending requests by handler processes 62 involves a plurality of the handler processes 62 attempting to accept the pending requests. Handler processes 62 attempt acceptance once the handler processes 62 reach particular points in their processing. The result of parallel request acceptance is that for any given request one or more handler processes 62 may attempt to accept that particular request simultaneously or very close to one another in time. Often, there will be fewer pending requests than there are handler processes 62 attempting to accept those requests. Some number of the plurality of handler processes 62 attempting parallel acceptance will successfully accept a pending request. Some of the handler processes 62 attempting parallel acceptance will not successfully accept a pending request because all pending requests have already been accepted by other handler processes 62. Those handler processes 62 that do not successfully accept a pending request will receive an error. Handler processes 62 are operable to process the error received when no request is available to be accepted and the processing of the received error will return the handler processes 62 to some suitable state operable to allow the process 62 to be able to handle future requests.

According to one embodiment of the invention, the spawner process 64 also provides the function of load balancing. Load balancing involves, for example, increasing or decreasing the number of handler processes 62 currently in existence based on the number of requests for which the server 52 is being asked to provide service. An objective of load balancing is providing efficient service while consuming a minimal amount of server resources. For example, the spawner may keep track of the number of client requests arriving in a particular span of time. Based on the number of requests arriving in that particular period of time, the spawner could increase the number of handler processes 62 so that requests do not build up in the buffer 58 or decrease the number of handler processes 62 so that fewer buffer 58 resources are needed. Load balancing allows for faster operation of server 52 because the server 52 is not burdened by unused and unneeded handler processes 62. Additionally, the server 52 will be able too more efficiently process other processes since the handler processes 62 will not be consuming as many system resources.

According to another embodiment of the invention, the handler processes 62 comprise multiple threads 70. Threads 70 allow an increase in the number of requests that can be simultaneously handled while utilizing fewer resources than an equivalent number of distinct handler processes 62 would. Threads 70 are basically light-weight processes or sub-processes that require fewer resources to create and maintain than full-weight processes. Threads typically achieve more efficient resource usage, while providing similar functionality to a full-weight process, by sharing memory resources. In a typical implementation of threads, for example, a single process is created with the process's associated memory and system resources. The system then initiates a plurality of control paths or threads. Thus, within the space and resources of a single process, multiple, simultaneous threads of processing control are achieved. Each thread is operable to achieve the same functionality as a single full-weight handler process.

Another embodiment of the invention involves the server having a plurality of physical processors 68. A server with a plurality of physical processors 68 allows one or more handler processes 62 to be run on a dedicated physical processor. A process running on a dedicated physical processor enjoys higher performance than a process which must share physical processor resources with other processes. In prior systems, the addition of a second physical processor will not double performance. Indeed, in the typical system, as more processors are added, the benefit of each additional processor decreases. For example, a typical system might recognize an approximately 25% increase in performance from the addition of a second processor, but may only realize an additional 10% increase in performance with the addition of a third physical processor, and perhaps only a 5% increase with the addition of a fourth physical processor. One of the reasons the performance does not increase linearly with the number of additional processors is that programs often contain bottlenecks. Typical bottlenecks are programs that can only be run in one place at a time. In a typical client-server system, a bottleneck is often created by the listener process 20. Regardless of how many physical processors exist on a particular server system, the listener process 20 in a typical client-server system can be run in only one place on one physical processor at any time. When a single processor is responsible of the acceptance and dispatch of client requests to handler processes 22, a bottleneck is created because the listener process 20 can only handle one request at a time. Even an extremely efficient listener process 20 running on an extremely high performance physical processor must still handle incoming requests one at a time and suffer the overhead of dispatching requests to separate handler processes 22.

The system of the present invention scales much better over a plurality of physical processors 68. A system that scales well is able to take advantage of additional physical processors 68. The present invention scales well because each handler process 62 is operable to attempt parallel acceptance of pending requests. Parallel acceptance allows each handler process 62 to operate at the maximum speed allowed by the physical processor 68 dedicated to that particular handler process 62. Since all handler processes 62 are operable to accept and service requests without the intervention of a separate listener process, requests can be accepted and serviced as fast as the physical processor 68 underlying each handler process 62 allows. The present invention allows a plurality of handler processes 62 to run on a plurality of physical processors 68 and realize high performance from each additional physical processor 68. Additionally, since each handler process 62 can operate independently of every other handler process 62, each additional physical processor 68 can be fully utilized by the handler processes 62 without creating any bottlenecks.

Figure 3:
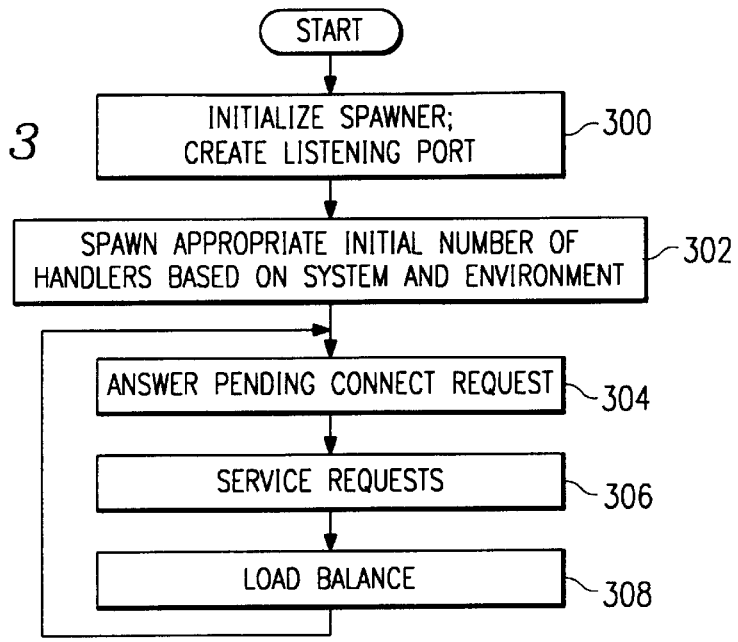
FIG. 3 is a flow chart illustrating the processing method of the present invention.

FIG. 3 is a flow chart of a method for initializing and running a true parallel client-server system according to the teachings of the present invention. The method begins at step 300 with the creation of the spawner process 64. The spawner process 64 is created by the operating system 54. The spawner process 64 is initialized by the operating system 54 such that the spawner process 64 is operable to create new processes. The act of creating a new process is typically known as spawning. The spawner process 64 then communicates with the operating system 54 in order to initialize the well-known address 56 at step 301. The well-known address 56 is configured such that the well-known address 56 is operable to receive client requests via the network 66. The well-known address is further configured to store pending requests in a buffer 58 pending service by handler processes 62. The spawner process 64 then creates some initial number of handler processes 62 at step 302. The initial number of handler processes 62 created by the spawner process 64 is typically based on some algorithm or heuristic. The algorithm or heuristic is used to determine an appropriate number of initial handler processes 62. For example, a heuristic could be based on historical data regarding the number of requests a particular server in a particular system is expected to handle and spawn a sufficient number of handler processes 62 to handle the expected load. The spawner process 64 creates the handler processes 62 at step 302 and initializes the handler processes 62 such that all the handler processes 62 all listen at and provide service to the well-known address 56 created in step 301.

Step 304 is the first step in the main loop of the embodiment of the present invention. In step 304 pending client requests are accepted. The steps involved in accepting pending requests are shown in more detail in FIG. 4. Once a request has been accepted by a particular handler process 62 in step 304, service is provided to that request in step 306. The service provided in step 306 is, typically, performing the action requested by the client 50 and returning the results to the client 50 via the network 66. After the handler process 62 has finished servicing an accepted request in step 306, the handler process 62 is available to have load balancing functions performed upon the handler process 62 in step 308. The load balancing in step 308 may involve the elimination of one or more handler processes 62. In step 308, unneeded handler processes 62 may be eliminated in order to conserve server resources. The load balancing in step 308 may also result in more handler processes 62 being spawned in order to deal with an increased load on the server 52. In the multi-threaded embodiment of the present invention, load balancing at step 308 may involve increasing or decreasing the number of threads 70 currently existing in a particular handler process 62. After any load balancing operations have been performed on the handler processes 62 in step 308, the system loops back and the handler processes 62 are once again available to accept pending requests in step 304.

Figure 4:
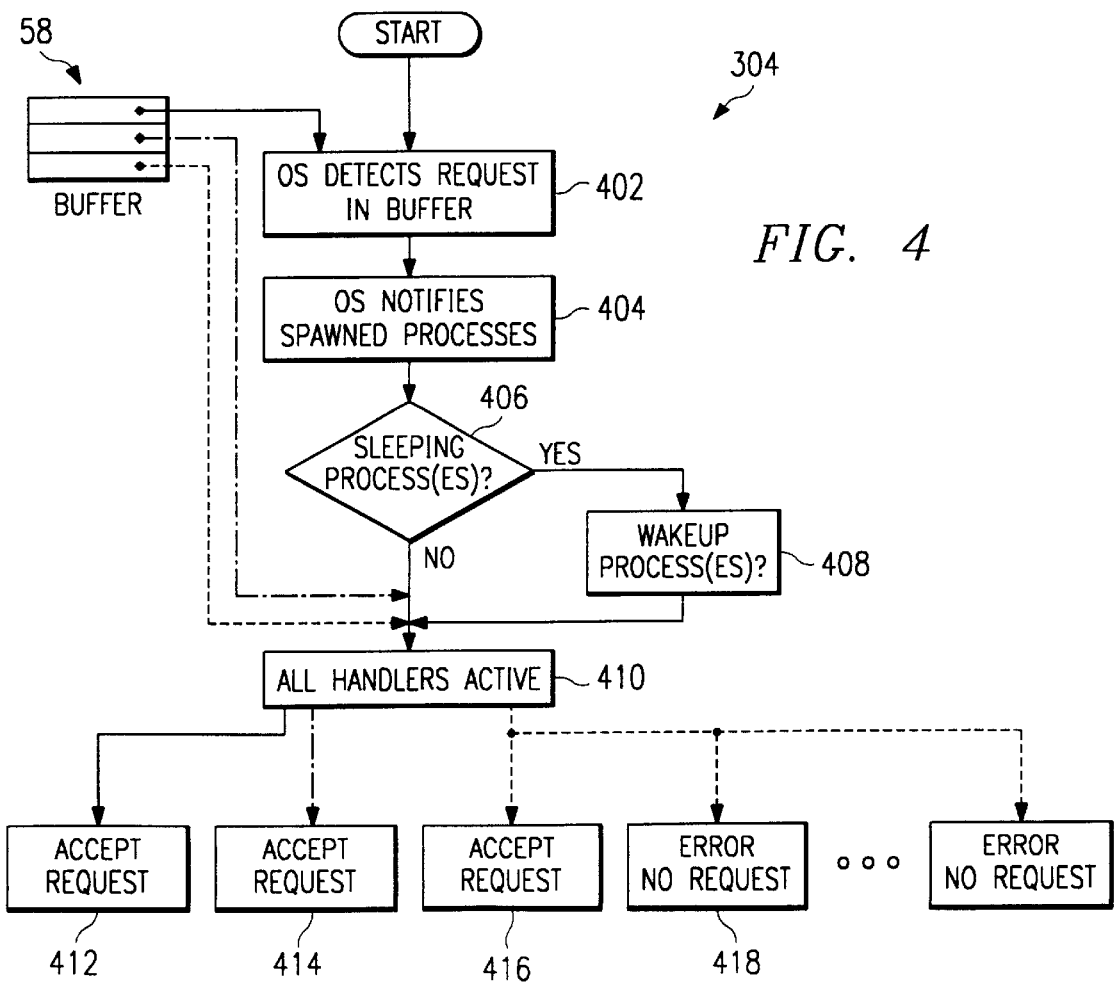
FIG. 4 is a flow chart illustrating the acceptance of a request by the present invention.

FIG. 4 is a flow chart of a method for answering pending connect requests in step 304 of FIG. 3. The method begins at step 402 with the operating system 54 detecting the existence of pending requests in the buffer 58. In step 402, the operating system 54 detects a change in the state of the buffer 58. The operating system 54 need not detect the number of requests that arrive in the buffer, but need only detect the change in the buffer from an empty state to a non-empty state. To illustrate the method of answering pending connect requests, FIG. 4 uses the example of three requests arriving in a previously empty buffer 58 at virtually the same moment. Thus, in FIG. 4, the operating system detects only one change in the buffer 58, from an empty state to a non-empty state, even though three requests have arrived. The solid line denotes the path taken by the first request to arrive in the buffer 58 and illustrates the path taken by the accept method when a change in buffer state is detected. The alternating dot-dash line and simple dashed line represent the path taken by the accept method when a change in state has previously been detected due to the arrival of a prior request, but before the prior request has been handled, other requests have arrived in the buffer. Thus, for the alternating dot-dash line and simple dash line no change in buffer state has been detected.

After a change in buffer state has been detected in step 402, the operating system 54 follows the solid line and notifies all handler processes 62, via the notification system 60, in parallel, of the arrival of one or more requests. The notification system 60 is operable to notify all handler processes 62 in parallel to facilitate parallel acceptance by the handler processes 62 of pending requests.

At the time of the notification in step 404, a handler process 62 could be in a variety of states. One of the states that the handler process 62 could be in is the sleep state. In the sleep state, the handler process 62 logically exists, but is not currently consuming physical processor resources. A sleeping handler process 62 is waiting for something to happen, and while waiting the handler process 62 is doing nothing. Thus, in step 406, the operating system 54 will see if there are any sleeping handler processes 62. If any handler processes 62 are found to be sleeping in step 406, the operating system 54 will proceed to step 408. In step 408, the operating system 54 will awaken all sleeping handler processes 62. Once the handler process 62 has been awakened, the handler process 62 is no longer waiting for something to happen and is now capable of attempting parallel acceptance of the pending requests. Once all handler processes 62 are awake and ready to attempt parallel acceptance either through step 408 or because no sleeping processes were found in step 406, the operating system 54 will proceed to step 410.

By step 410 the operating system has ensured that all handler processes 62 are active and operable to attempt parallel acceptance. Even though all handler processes 62 are now active and operable to accept pending requests, not all handler processes 62 will necessarily immediately attempt acceptance. Some handler processes 62 might currently be busy providing service to a previously accepted request and be unable to accept another request until the previous request has been completely serviced. However, handler processes 62 which are currently servicing previously accepted client requests will still have received notification, via the notification system 60, that requests are pending in the buffer. The busy handler processes 62 will honor the notification and will typically still attempt to accept pending requests once they have serviced previously accepted requests.

Once all handler processes 62 are ensured to be active by step 410, the first pending request, denoted by the solid line, proceeds to step 412 where the request is accepted by some particular handler process 62. No particular handler process 62 has been specifically tasked to accept the request in step 412, but one handler process 62 will win the parallel acceptance race and successfully accept the first pending request.

The second pending request, denoted by the alternating dot-dash line, is accepted at step 414. The second pending request, because the second request arrives in the buffer 58 that is already non-empty, does not cause the operating system 54 to do the detect in step 402. Since no change in the buffer state was detected in step 402 for the second pending request, the operating system 54 will not reactivate the notification system 60 in step 404, nor will the operating system 54 see if any processes are currently sleeping in step 406. The second pending request essentially proceeds directly to step 410 where all the handler processes 62 are active and operable to accept pending requests. Thus, while some particular handler process 62 will accept the second pending request in step 414, no particular handler process 62 has been specifically tasked to accept the second request.

The third request, denoted by the simple dash line, follows the same path as the second pending request and directly reaches step 410 where all handler processes 62 are active and ready to accept pending requests. The third pending request will be accepted in step 416 by some particular handler process 62. Again, the particular handler process 62 that accepts the third pending request in step 416 has not been predetermined.

At the end of step 416 all pending requests have been accepted and the buffer 58 is empty. The handler processes 62 which did not accept the pending requests then proceed to step 418. The unsuccessful handler processes 62 receive an error message that no request is pending and the handler processes 62 then perform processing on the error message. To process the error message, the handler processes 62 return themselves to some predetermined state. For example, the handler process 62 could enter a sleep state so that the handler process 62 is not consuming system resources while the handler process 62 has nothing to process. The handler processes 62 returned to a sleep state will then be dependent upon being awakened by the operating system 54 in step 408. Alternatively, for example, the handler processes 62 could remain awake so that the handler processes 62 may immediately accept pending requests once notification is received. After steps 412, 414, 416, and 418 those handler processes 62 that have accepted requests will provide service to those requests as in step 306 of FIG. 3.

One of the advantages of the present invention is server speed. The system of parallel acceptance by the handler processes 62 prevents the creation of any bottlenecks in the process of accepting pending requests. The lack of bottlenecks allows a server to process client requests at high speed.

The present invention also improves server efficiency. The present invention effectively utilizes all physical processors 68 in the server 52. By running handler processes 62 on distinct physical processors 68, no physical processor 68 is left under-utilized. Additionally, since the handler processes 62 attempt parallel acceptance, pending requests are removed from the buffer 58 as rapidly as the operating system 54 allows.

The present invention also increases efficiency by maximizing the use of server 52 resources. The handler processes 62 do not have to wait around for another process to dispatch pending requests to the handler processes 62. By allowing handler processes 62 to accept and provide service to pending requests without delay, all handler processes 62 that could be servicing requests are servicing requests. The parallel acceptance system allows rapid acceptance of all pending requests by handler processes 62 and avoids allowing pending requests to build-up in the buffer 18.

The present invention further increases efficiency by minimizing the number of steps between the arrival of the request at the server 52 and the handling of the request by the handler process 62. Allowing all handler processes 62 to accept and remove pending requests from the buffer 58 without an intervening process to dispatch the requests allows pending requests to be accepted and serviced using a minimal number of steps.

The present invention also increases the robustness of the server 52. The present invention avoids having a single point of failure since all handler processes 62 are operable to accept pending requests. The failure of any particular handler process 62 has a minimal impact on the server 52. Since no single process is responsible for handling or accepting pending requests, the failure of a process does not prevent the server 52 from functioning.

The following Table 1 includes exemplary C++ source code for one embodiment of a client server system constructed according to the teachings of the present invention.

TABLE 1

```
#include <sys/types.h>
#include <sys/socket.h>
#include <sys/stat.h>
#include <sys/un.h>
#include <string.h>
#include <stdio.h>
#include <stdlib.h>
#include <stddef.h>
#include <signal.h>
#include <unistd.h>
#include <errno.h>
#include <netinet/in.h>
#include <arpa/inet.h>
#define HOST_ADDR "206.189.43.13"
#define MAX_PROCS 10
int pids[MAX_PROCS];
int numpids = 0;
int main( int argc, char ** argv )
{
    char temp[1000];
    if( argc < 2 )
    {
        printf("Parent: No port given\n");
        exit(1);
    }
int port = atoi( argv[1] );
1    int sock;
2    if( ( sock = socket( AF_INET, SOCK_STREAM, 0 )) < 0)
3    {
4        fprintf( stderr, "Parent: Unable to open socket\n" );
5        exit(1);
6    }
7
8    struct sockaddr_in serv_addr;
9
10   memset( (char *) &serv_addr, 0, sizeof( serv_addr ));
11   serv_add.sin_family = AF_INET;
12   serv_addr.sin_addr.s_addr = inet_addr( INADDR_ANY );
13   serv_addr.sin_port = htons(port);
14
15   if( bind( sock, (struct sockaddr *) &serv_addr,
16               sizeof( serv_addr )) < 0 )
17   {
18      fprintf( stderr, "Parent: Unable to bind--" );
19      fprintf( stderr, "errno = %d\n", errno );
20      exit(1);
21   }
        listen(sock,5);
        // fork children
        int ii;
        int pid;
        for( ii=0; ii<MAX_PROCS; ii++ )
        {
            printf("Parent: Forking child #%d\n", ii);
            pid = fork();
            if( pid == 0 )
            {
                // The first fork succeeded, and this is the child
                // So, continue with the exec.
                char tmp[200];
                char tmp1[200];
                sprintf( tmp, "%d", sock );
                sprintf( tmp1, "%d", ii );
                // The second fork succeeded, and this is the
                // child. So exec the child program.
                int retval = execlp ("child2", "CHILD2", tmp, tmp1,
                (char*)0);
                if( retval == -1 )
                {
                    printf("Parent: Failed to exec child2\n");
                }
            }
```

TABLE 1-continued

```
            if( pid < 0 )
            {
                // First fork failed.
                // log an error
                printf("Parent: Fork #%d failed.\n", ii);
            }
            else
            {
                pids[numpids++] = pid;
            }
        }
        gets(temp);
        for( ii = 0; ii<numpide; ii++ )
        {
            printf("Parent: Killing child %d\n", ii );
            kill( pids[ii], SIGTERM );
            waitpid( pids[ii], NULL, 0 );
        }
    }
}
```

Referring to Table 1, the critical portion of the code has been designated with line numbers 1–21. In line 1, the software declares the variable "sock" which is necessary to store the integer representation of a socket. A socket is a logical construct in the TCP/IP protocol that is used to communicate with the specified port. In line 2, the routine requests the operating system to create the socket that is appropriate for the TCP/IP communications protocol. In lines 4 and 5, an error message is printed and the program is terminated if the socket could not be created for whatever reason. In line 8, the routine declares a variable "serv_addr" of an appropriate type to store a port and machine address to be used under the TCP/IP communications protocol. In line 10, the port machine address variable is reset. In line 11, the TPC/IP communications protocol is assigned to the "serv_addr" variable. In line 12, an appropriate value is assigned to inform the operating system that any other machine can connect to the port associated with the "serv_addr" variable. In line 13, the desired listening port is assigned to the server. In lines 15–16, the socket created previously is bound to the port to be listened to by the routine and this operation is checked for successful completion. In lines 18–20 various error conditions are reported and the program is terminated.

In the next section of the program following the command "listen (sock, 5);", children server processes are spawned. This section of the code ends at the "gets (temp);" function call. The "gets" function blocks on input and stops the spawning process. The remaining code is used to terminate all of the spawned processes and to verify their termination.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A software system comprising:
    a server system comprising an operating system, the operating system operable to support a well-known address, the well-known address operable to receive data from a network, the operating system further operable to provide interprocess communication;

the operating system further operable to support a buffer associated with the well-known address, the buffer operable to store information received at the well-known address;

a plurality of handler processes operable to access a notification system in parallel, to attempt parallel acceptance of pending requests from the buffer, to process error messages informing the handler process that no requests are pending in the buffer, and to service requests accepted from the buffer, such that a single request will result in the notification to a plurality of the handler processes that a plurality of requests are pending in the buffer, one handler process which will service the request, the remaining handler processes operable to service other, later requests or to perform error handling if no other requests are present;

the operating system further comprising the notification system, the notification system comprising a flag, the flag operable to be accessed by a plurality of handler processes, and the flag further operable to reflect the existence or non-existence of pending requests in the buffer;

a network system operable to allow communication between the server system and a plurality of client systems; and a spawner process operable to create or destroy a plurality of handler processes, the spawner process further operable to increase or decrease the number of handler processes in existence, the magnitude of the increase or decrease based on an algorithm, such that the algorithm attempts to balance the number of handler processes necessary to provide rapid service to client requests with the amount of server resources used to support the handler processes.

2. The software system according to claim 1, wherein the algorithm comprises a heuristic.

* * * * *